3,362,929
OZONE RESISTANT COMPOSITION
Henry J. Kehe, Akron, Ohio, assignor to The B. F. Goodrich Company, New York, N.Y., a corporation of New York
No Drawing. Filed Mar. 1, 1966, Ser. No. 530,771
5 Claims. (Cl. 260—45.8)

ABSTRACT OF THE DISCLOSURE 6-anilino-2,2,4-trimethyl-1,2,3,4-tetrahydroquinoline has been found to be an effective protective agent against the effects of ozone. The 6-anilino-2,2,4-trimethyl-1,2,3,4-tetrahydroquinoline is particularly effective as an antiozonant for elastomeric compositions and vulcanizates thereof.

---

This invention relates to the preservation of rubber and elastomer compositions resistant to attack by ozone and relates more particularly to ozone resistant elastomeric compositions containing 6-anilino-2,2,4-trimethyl-1,2,3,4-tetrahydroquinoline as an antiozonant.

Ozone cracking and the protection of vulcanizates of sulfur-vulcanizable rubbers against degradation by ozone, which is especially serious with respect to the service life of tires is a continuing problem in the rubber industry. None of the many commercially available antioxidants and antiozonants is completely satisfactory for protecting elastomer vulcanizates against ozone cracking. It is an object of this invention to provide elastomeric compositions and vulcanizates which are more effectively protected against the deleterious effects of ozone than with presently known compounds. This and other objects are accomplished by use in rubber or elastomer compounds of 6-anilino-2,2,4-trimethyl-1,2,3,4 - tetrahydroquinoline. Vulcanizates of such compositions are efficiently resistant to ozone attack.

Certain substitution products of 2,2,4-trimethyl-1,2-dihydroquinoline and 2,2,4-trimethyl-1,2,3,4 - tetrahydroquinoline are known as ozone inhibitors in rubber stocks. For example, 6-ethoxy-2,2,4-trimethyl-1,2-dihydroquinoline has been used as such a protective agent. U.S. Patent 2,794,020 teaches use of 6-amino substituted 2,2,4-trimethyl-1,2,3,4-tetrahydroquinolines as antiozonants. In my copending application, Ser. No. 530,786, filed Mar. 1, 1966, the unexpected utility of 6-anilino-2,2,4-trimethyl-1,2-dihydroquinoline as an antiozonant is disclosed. I have now found, quite unexpectedly, that 6-anilino-2,2,4-trimethyl-1,2,3,4-tetrahydroquinoline possessed antiozonant properties in rubbers and elastomers superior to the dihydroquinoline derivatives and to many commercially available antiozonants.

The protective agent of this invention is readily prepared by condensing two mols of acetone with one mol of p-aminodiphenylamine at elevated temperatures and in the presence of a catalyst to form 6-anilino-2,2,4-trimethyl-1,2-dihydroquinoline. The 6-anilino-2,2,4-trimethyl-1,2-dihydroquinoline is then catalytically hydrogenated to yield 6-anilino-2,2,4-trimethyl-1,2,3,4-tetrahydroquinoline.

The antiozonant of this invention is mixed into rubber stocks in any conventional manner. It is readily incorporated into the rubber prior to vulcanization by mixing on a rubber mill or in an internal mixer, such as a Banbury; added to solutions or dispersions of the polymer; added as is, in solvents, in dispersions, masterbatched with other compounding ingredients and the like. The agent may be used in rubber compounds with any of the conventional processing aids and oils, fillers, reinforcing agents, extenders, curing agents, accelerators, antioxidants, antiozonants, and the like. It is compatible with known antioxidants and antiozonants, and in combination with certain of these shows synergistic activity.

Antioxidants which may be used in conjunction with 6-anilino-2,2,4-trimethyl-1,2,3,4 - tetrahydroquinoline include derivatives or homologs of hydroquinone as the monobenzyl ether of hydroquinone or 2,5-di-tert-butylhydroquinone; substituted phenols as styrenated phenols; disubstituted cresols as 2,6-di-tert-butyl-p-cresol; bisphenols as 2,2' - methylenebis(4 - methyl-6-tert-butylphenol) and 4,4'-methylenebis(2,6-di-tert-butylphenol); bisthiophenols as thiobis(di-sec-amylphenol) and 4,4'-thiobis(6-tert-butyl-o-cresol); catechol derivatives as di-o-tolylguanidine salt of dipyrocatechol borate; naphthol derivarivatives as 1,1'-methylenebis-2-naphthol; butylated 4, 4'-isopropylidenediphenol; aminophenols as N-lauroyl-p-aminophenols; primary polyamines as p,p'-diaminodiphenylmethane; diarylamines as N-phenyl-alpha-naphthylamine, N-phenyl-beta-naphthylamine and p-isopropoxydiphenylamine; bisdiarylamines as N,N'-diphenyl-p-phenylenediamine, N,N'-di-beta - naphthyl-p-phenylenediamine; diarylamines as N-phenyl-alpha-naphthylamine and 2,4-diaminotoluene, N,N'-diphenylethylenediamine and N,N'-diphenyl p-phenylenediamine; bisdiarylamines as N-cyclohexyl-N'-phenyl-p-phenylenediamine; alkylated diarylamines as monooctyl- and dioctyldiphenylamine; mixtures containing alkylated diarylamines as mixtures of octyldiphenylamines and wax; ketone-diarylamine condensation products as diphenylamine-acetone condensation products; dihydroquinolines as 1,2-dihydro-2,2,4-trimethyl-6-phenyl-quinoline; mixtures of dihydroquinolines and diarylamines as mixtures of polymerized 1,2-dihydro-2,2,4-trimethylquinoline and N,N'-diphenyl-p-phenylenediamine; aldehydesamine condensation products as aldol-alpha-naphthylamine condensation products; butyraldehyde-aniline condensation products; alkylarylamines as N,N'-diphenylethylenediamine; aldehyde imines as N,N'-disalicylalethylenediamine; alkyl aryl phosphites; dithiocarbamates, thiazyl derivatives; thiuram disulfides; thiodipropionates and the like.

It is not necessary that the 6-anilino-2,2,4-trimethyl-1,2,3,4-tetrahydroquinoline be absolutely pure to protect rubbers from ozone attack. The high-boiling viscous oil which is obtained directly by fractionation of the hydrogenated mixture generally needs no further purification and will effectively inhibit ozone attack in elastomers and rubber. If desired, the 6-anilino-2,2,4-trimethyl-1,2, 3,4-tetrahydroquinoline may be recrystallized from suitable organic solvents.

The antiozonant of my invention is useful for the protection of vulcanizable rubbers, natural or synthetic, which are subject to attack by ozone, particularly in the vulcanized state. Vulcanizable rubbers and elastomers which are most susceptible to ozone attack and which can be protected in accordance with this invention, usually contain one or more percent olefinic unsaturation and include the homopolymers, copolymers and interpolymers of conjugated dienes, such as polybutadiene, butadiene-styrene, butadiene-acrylonitrile, polyisoprene, polychloroprene, isobutylene-isoprene, butadiene-vinyl pyridine, butadiene-alkyl acrylate ester, butadiene-acrylic acid, butadiene-methacrylic acid, butadiene-ester of methacrylic acid, butadiene-chlorostyrene, butadiene-methyl vinyl ketone, and the like. Such elastomers generally contain more than 50% of a diolefin, usually a conjugated diene containing 4 to 6 carbon atoms copolymerized with one or more other vinylidene compounds containing the $CH_2=C<$ group, that is, containing a terminal methylene group attached by a double bond to a carbon atom. Rubbers such as the poly-sulfides, silicones and the like, although less sensitive to ozone attack than the diene rubbers, nevertheless show an improved resistance to ozone with my antiozone agent. The invention can also be used in the saturated olefin homopolymers, copolymers and terpolymers, such as ethylene-propylene rubber, ethylene-propylene-diene rubbers, acrylate ester elastomers and the like. The amount of 6-anilino-2,2,4-trimethyl-1,2,3,4-tetrahydroquinoline added to these rubbers and elastomers will vary in the range of about 0.25 part to about nine parts per hundred parts of the rubber, preferably from about one part to about three parts.

The following examples will serve to illustrate the invention more fully.

Preparation of 6-anilino-2,2,4-trimethyl-1,2,3,4-tetrahydroquinoline. To a reactor equipped with a dropping funnel, a stirrer and a condenser leading to a receiver was added 184 grams (1 mol) of 4-aminodiphenylamine and 8.3 ml. (0.1 mol) of concentrated aqueous hydrochloric acid (density 1.19). The mixture was stirred and heated at about 115–125° C. while 440 ml. of acetone was dropped in at a rate of about 5 ml./min. After about 90 minutes, the addition of acetone was complete and 80 ml. of acetone had reacted. The unreacted acetone was recycled through another 90 minute run with an additional 9 ml. of acetone being consumed. The reaction mixture was then treated with about 60 ml. of a 15% aqueous sodium carbonate solution and transferred to a separatory funnel with two 25 ml. portions of toluene. The aqueous layer was discarded and the organic portion fractionated. The yellowish highly viscous fraction B.P. 170–208° C./0.7 mm. was collected. Crystallization of a portion of the crude product from benzene gave a pale yellow crystalline material with a melting range 85–87.5° C. Elemental analysis indicated 81.66% carbon, 7.62% hydrogen and 10.26% nitrogen. Theoretical for the 6-anilino-2,2,4-trimethyl-1,2-dihydroquinoline is 81.80% carbon, 7.58% hydrogen and 10.62% nitrogen. A molecular weight determination agreed, within the limits of experimental error, with the molecular weight calculated for the 6-anilino-2,2,4-trimethyl-1,2-dihydroquinoline.

6-anilino-2,2,4-trimethyl - 1,2 - dihydroquinoline (264 grams; 1 mol) was charged into a high-pressure reactor with 300 ml. of ethanol and 2.6 grams of Raney nickel. The reactor was purged with nitrogen, sealed and thoroughly flushed with hydrogen. The reactor was then heated with shaking to about 100° C. and the pressure maintained between 750–825 p.s.i.g. by the addition of hydrogen. After about 6 hours, 2.24 grams (1.12 mol) of hydrogen had been absorbed and the reactor was cooled and vented. The reaction mixture was filtered and the product recovered by fractional distillation. The pale golden yellow viscous fraction, boiling range 165–180° C./0.7 mm., was collected. The yield of 6-anilino-2,2,4-trimethyl-1,2,3,4-tetrahydroquinoline was 250.7 grams.

The 6-anilino-2,2,4-trimethyl - 1,2,3,4-tetrahydroquinoline was tested in an oil-extended SBR compound typical of those used in the manufacture of passenger car tires. The recipe used was:

| | Parts by weight |
|---|---|
| Oil-extended SBR | 125.0 |
| Zinc oxide | 5.0 |
| Stearic acid | 1.0 |
| Carbon black | 63.0 |
| Sulfur | 2.0 |
| N-cyclohexyl-2-benzothiazyl sulfenamide | 0.8 |
| Antiozonant | 0.0–5.0 |

The oil-extended SBR (23.5 weight percent styrene) used contained 25 phr. aromatic processing oil and had a specific gravity of 0.95 and ML 4' at 212° F.=50–65.

The evaluation of antiozonants under static conditions alone is not the best indication of their service life in tires and other rubber articles which undergo much flexing. For this reason the ozone test for the antiozonant of my invention is dynamic outdoor exposure to natural weathering. Test specimens were cut from 6" x 6" x .060–.075" ASTM sheets prepared by mill mixing the ingredients and curing for 60 minutes at 302° F. The outdoor dynamic ozone test consisted of mounting 0.5" x 6" x .075" test specimens on a De Mattia flexing machine at a 45° angle facing south, leaving four inches as the flexing length. A flex rate of about 300 flexures per minute was maintained for 24 hours per day.

On completion of each test the samples were evaluated by examination at 15× magnification with a microscope equipped with a reticle in one eyepiece. The mean crack length and mean crack width of six or more randomly selected cracks were estimated while the sample was held in a strained position comparable to that of the maximum strain during the test run. The product of length times width was determined and designated the "severity of ozone cracking," hereafter abbreviated SOC. The SOC values are directly proportional to the surface area of the open voids of the ozone crack as well as the depth of the ozone crack. Therefore, high SOC values indicate a wide, deep and long crack and represent severe attack by ozone. On the other hand, a low SOC value indicates a resistance to ozone.

The antiozonant of my invention and several materials having similar chemical structures, some of which are commercially available were tested in accordance with the procedure described above. SOC values were determined at the completion of the test and are set forth below.

Tables I and II present the data from the outdoor flex-cracking test. The test samples contained 3.0 parts antiozonant per 100 parts SBR, except for the control which contained no antiozonant. SOC values were determined after 11 days and 24 days outdoor exposure.

TABLE I

| Antiozonant | SOC | |
|---|---|---|
| | 11 days | 24 days |
| Control | 58.2 | 111 |
| 6-anilino-2,2,4-trimethyl-1,2,3,4-tetrahydroquinoline | 1.3 | 5.2 |
| 6-anilino-2,2,4-trimethyl-1,2-dihydroquinoline | 3.1 | 10.1 |
| 2,2,4-trimethyl-1,2-dihydroquinoline | 28.2 | 75.9 |
| 2,2,4-trimethyl-1,2,3,4-tetrahydroquinoline | 53.8 | 112 |
| 2,2,4-trimethyl-1,2-dihydroquinoline (polymeric)* | 17.2 | 56.8 |

*A commercial antiozonant.

The 6-anilino-2,2,4-trimethyl - 1,2,3,4-tetrahydroquinoline and polymeric 2,2,4-trimethyl-1,2-dihydroquinoline, a commercially available antiozonant, were compared at various levels in the outdoor flex-cracking test. The SOC values were determined after 26 days and are presented in Table II.

TABLE II

| Phr. | SOC | |
|---|---|---|
| | 6-anilino-2,2,4-trimethyl-1,2,3,4-tetrahydroquinoline | 2,2,4-trimethyl-1,2-dihydroquinoline (polymeric) |
| 1 | 16.5 | 37.2 |
| 2 | 4.5 | 32.4 |
| 3 | 4.1 | 13.1 |
| 5 | 3.1 | 9.4 |

Tables I and II show that the 6-anilino-2,2,4-trimethyl-1,2,3,4-tetrahydroquinoline of this invention is an effective antiozonant, superior to the antiozone agents which are currently being used by the rubber industry and unexpectedly superior to compounds closely related in structure, and that it can be used in rubber compositions specifically compounded for use in automobile tires, wire coating and any other rubber compound and article exposed to ozone. When the above examples are repeated with nitrile rubber, polybutadiene, natural rubber, polychloroprene and polyolefin elastomers, vulcanizates with excellent resistance to ozone cracking are obtained.

I claim:
1. A composition comprising (A) an elastomer selected from the group consisting of elastomers containing at least one percent olefinic unsaturation, and saturated olefin polymers, and (B) 6-anilino-2,2,4-trimethyl-1,2,3,4-tetrahydroquinoline.
2. The composition of claim 1 wherein the elastomer contains at least one percent olefinic unsaturation and the 6-anilino-2,2,4-trimethyl - 1,2,3,4-tetrahydroquinoline is present in amount from about 0.25 to 9 parts per hundred parts of elastomer.
3. The composition of claim 2 wherein the elastomer contains more than 50% polymerized conjugated diene and the 6-anilino-2,2,4-trimethyl-1,2,3,4-tetrahydroquinoline is present in amount from about one to three parts per hundred parts of elastomer.
4. A vulcanized composition of claim 2.
5. A vulcanized composition of claim 3.

References Cited
UNITED STATES PATENTS
2,794,020   5/1967   Harris et al. _____ 260—814 X DONALD E. CZAJA, *Primary Examiner.*

M. J. WELSH, *Assistant Examiner.*